(12) United States Patent
Odinak

(10) Patent No.: US 7,496,353 B2
(45) Date of Patent: Feb. 24, 2009

(54) SYSTEM AND METHOD FOR PROVIDING MULTI-PARTY MESSAGE-BASED VOICE COMMUNICATIONS

(75) Inventor: Gilad Odinak, Bellevue, WA (US)

(73) Assignee: Intellisist, Inc., Bellevue, WA (US)

( * ) Notice: Subject to any disclaimer, the term of this patent is extended or adjusted under 35 U.S.C. 154(b) by 972 days.

(21) Appl. No.: 10/719,452

(22) Filed: Nov. 21, 2003

(65) Prior Publication Data

US 2004/0102186 A1 May 27, 2004

Related U.S. Application Data

(60) Provisional application No. 60/428,533, filed on Nov. 22, 2002.

(51) Int. Cl.
*H04M 11/10* (2006.01)

(52) U.S. Cl. .................... 455/413; 455/518

(58) Field of Classification Search ............. 455/414.1, 455/413, 514, 518, 519, 521; 379/68, 88.16, 379/88.17, 88.09, 88.1
See application file for complete search history.

(56) References Cited

U.S. PATENT DOCUMENTS

| | | | |
|---|---|---|---|
| 6,334,103 B1 | 12/2001 | Surace et al. | |
| 6,401,061 B1 | 6/2002 | Zieman | |
| 6,757,531 B1 * | 6/2004 | Haaramo et al. | 455/414.1 |
| 6,917,799 B2 * | 7/2005 | Ross et al. | 455/414.1 |
| 2001/0014146 A1 | 8/2001 | Beyda et al. | |
| 2001/0031641 A1 | 10/2001 | Ung et al. | |
| 2001/0053977 A1 | 12/2001 | Schaefer | |
| 2002/0006126 A1 | 1/2002 | Johnson et al. | |
| 2002/0007396 A1 | 1/2002 | Takakura et al. | |
| 2002/0016163 A1 | 2/2002 | Burgan et al. | |
| 2002/0039895 A1 * | 4/2002 | Ross et al. | 455/414 |
| 2002/0077823 A1 | 6/2002 | Fox et al. | |
| 2002/0094803 A1 | 7/2002 | Burgan et al. | |
| 2002/0102999 A1 * | 8/2002 | Maggenti et al. | 455/518 |
| 2002/0146110 A1 | 10/2002 | Fromm | |
| 2003/0078064 A1 * | 4/2003 | Chan | 455/514 |
| 2003/0083086 A1 * | 5/2003 | Toyryla et al. | 455/518 |
| 2004/0162724 A1 | 8/2004 | Hill et al. | |
| 2004/0171400 A1 * | 9/2004 | Rosen et al. | 455/518 |
| 2004/0203793 A1 * | 10/2004 | Dorenbosch | 455/445 |
| 2004/0203978 A1 * | 10/2004 | Wong et al. | 455/518 |

FOREIGN PATENT DOCUMENTS

WO        WO 01/47218        6/2001

* cited by examiner

*Primary Examiner*—Olisa Anwah
(74) *Attorney, Agent, or Firm*—Patrick J. S. Inouye

(57) ABSTRACT

One embodiment of the present invention provides a system and method for providing flexible message-based communications between two or more individuals logically interconnected over a centralized messaging infrastructure. A voice message server interfaces to a plurality of personal communication devices (PCDs) over a wireless data network. Each PCD includes an "Attention" button that alerts the PCD to begin processing voice messages. Voice messages are forwarded to the voice message server and are queued, stored and played to the user of the receiving PCD. Each user must be signed on in a voice messaging session and can participate in one or more moderatable and simultaneous discussion groups.

32 Claims, 5 Drawing Sheets

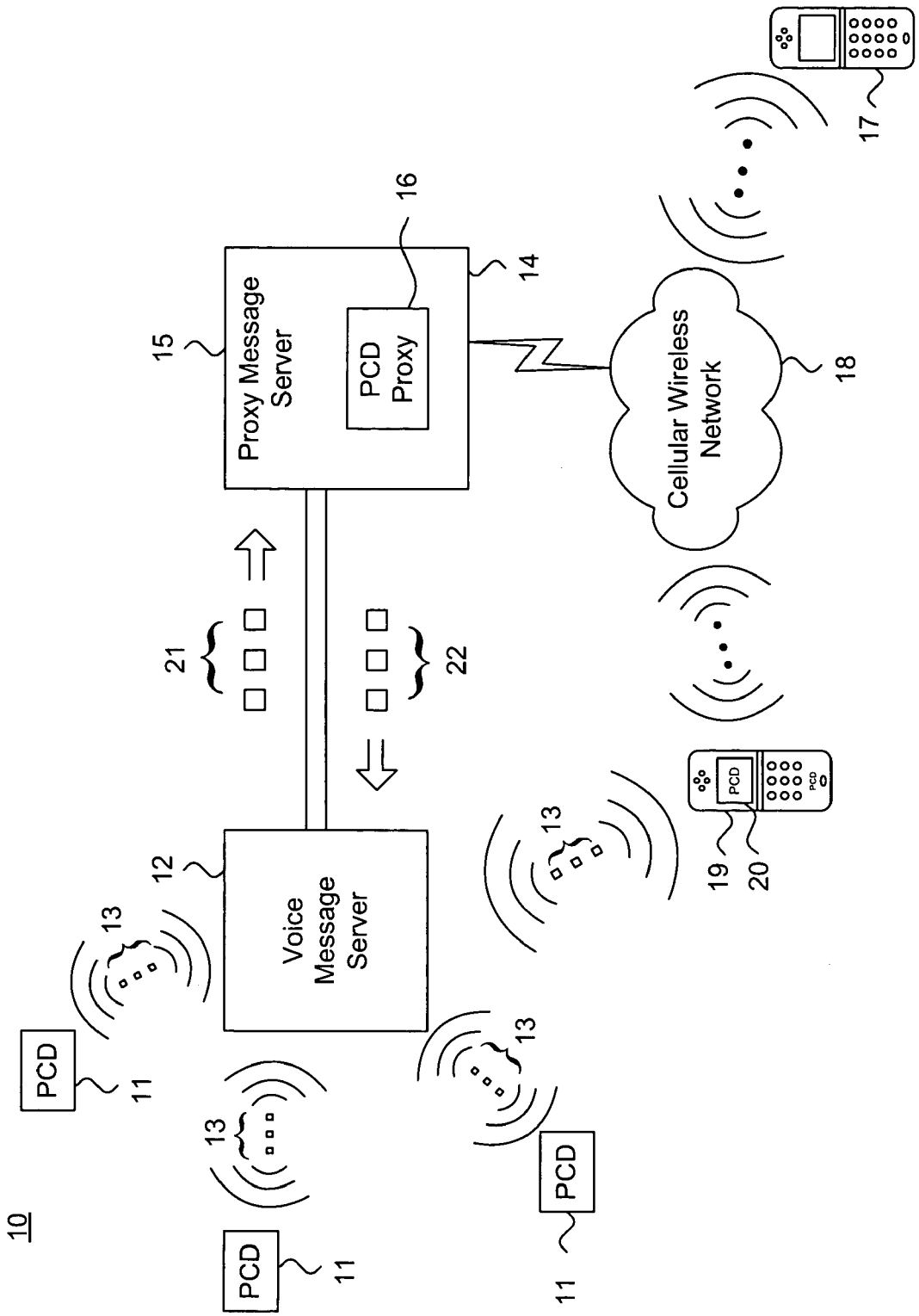

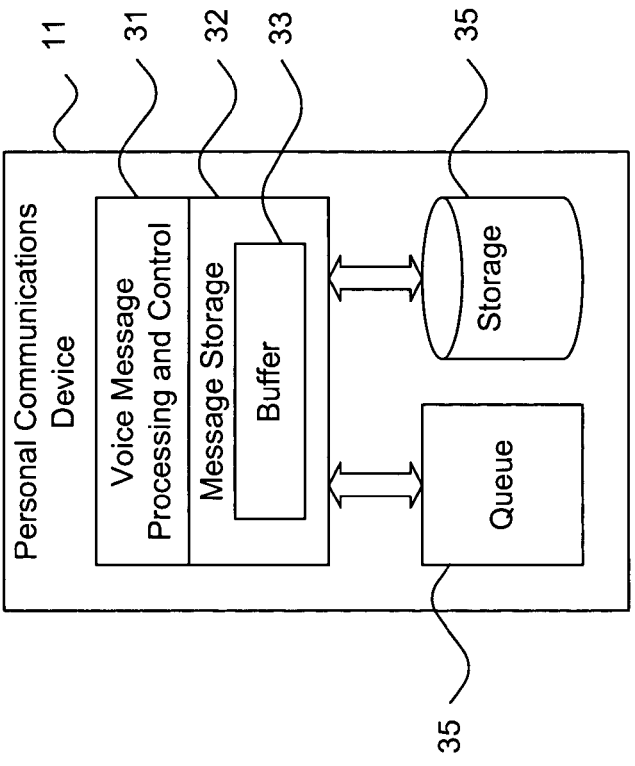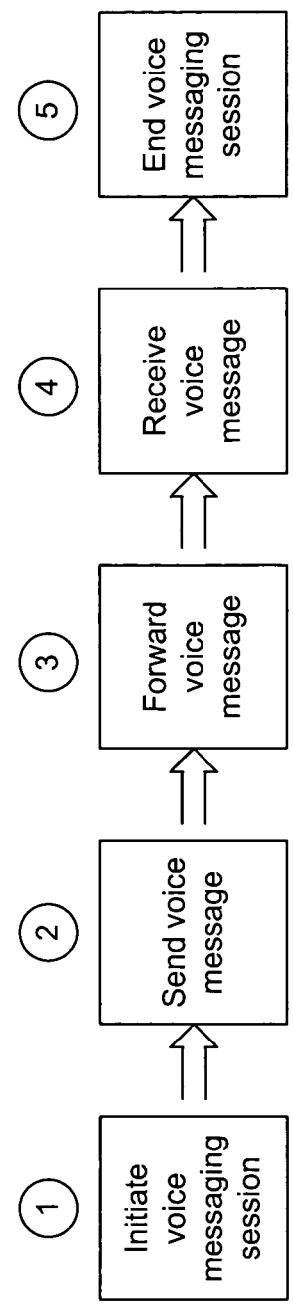

90

SYSTEM AND METHOD FOR PROVIDING MULTI-PARTY MESSAGE-BASED VOICE COMMUNICATIONS

CROSS-REFERENCE TO RELATED APPLICATION

This non-provisional patent application claims priority under 35 USC § 119(e) to U.S. provisional patent application, Ser. No. 60/428,533, filed Nov. 22, 2002, the disclosure of which is incorporated by reference.

FIELD OF THE INVENTION

The present invention relates in general to message-based voice communications and, in particular, to a system and method for providing multi-party message-based voice communications.

BACKGROUND OF THE INVENTION

Historically, the spoken word has been the preferred and, prior to the advent of writing, principal medium for communication in human society, particularly for social networking. Writing evolved as an alternate medium for communication, beginning with ancient civilizations that needed to track food and livestock inventories. Unlike the spoken word, writing offered a more precise and persistent medium that functioned independently from the time and place of expression. Thus, even the earliest forms of writing allowed for so-called "time-shifting," which enables a message composed by a sender to be read at a later time by a recipient.

The advent of the electronic age greatly increased the evolution of enhanced forms of spoken and written communication. Currently, the telephone offers the mainstream technology for transacting voice communications with over 90% of the households in the United States having telephone service. In addition, wireless telephone usage has grown dramatically in the last decade with an estimated one billion wireless telephone users worldwide. Electronic mail (email) and text messaging offer the closest equivalent technology for written communication, spurred by the rapid growth and development of the Internet and the proliferation of personal computer usage. In 1999, an estimated 130 million people used email in the United State alone, with at least 600 million email users worldwide.

Traditionally, voice and text communications have followed different usage paradigms. Voice communications, via a telephone, are instantaneous, real-time, and primarily one-to-one communications methods. Written communications, via email, are time-shifted and often one-to-many or many-to-many communication methods with an implied means for persistently chronicling communications through email storage.

Over time, both forms of communication have accumulated features reminiscent of the other. For instance, voice-mail and conference calling respectively allow time-shifted and one-to-many or many-to-many voice communications. Analogously, voice mail attachments to conventional email messages allow instantaneous receipt of verbal communications contemporaneous to email message receipt.

Recently, text messaging, popularly referred to as Instant Messaging, introduced a new category of electronic written communications. Text messaging combines the immediacy of telephone voice communication with the textual format of email communications. Text messaging moves the email paradigm into near real-time by enabling users to compose and exchange messages during an interactive session. Text messaging provides a rapid form of two-way written communication that still allows a sender to review a message prior to dispatch. Additionally, the use of sessions enables group communication through chat forums and can be used to unilaterally inform users about the availability of other group members. This past year, there were over 220 million text messaging users worldwide.

Operationally, text messaging begins with a signed-on user composing a text message and dispatching the text message to another signed-on user. Upon receipt, the message is displayed on the screen of the recipient in a near-instantaneous fashion and the other user can compose a reply for dispatch back to the first user.

Text messaging has been implemented in several formats. Instant Messaging operates as an adjunct to traditional email clients as an add-on Internet-based application. The Short Messaging Service (SMS) is a wireless telephone variant of Instant Messaging, which has grown rapidly in popularity, especially in Europe. Independent of the type of text messaging employed, users are able to keep a log of transmitted and received messages.

Both telephonic and electronic written communications have helped society keep up with the accelerating pace of modern living and, at the same time, have contributed to this acceleration. For instance, wireless telephone and messaging communications now enable people to perform multiple tasks almost anywhere. However, both forms of communication have limitations. Telephone communication, for example, requires the full attention of the user and the ability to respond in real-time to the other party. Conversely, text messaging enables a user to defer sending a response until convenient, but requires the user to read each message on a display and to manually compose a response through typing, both difficult activities to perform while mobile.

Wireless push-to-talk voice communication is described in U.S. Patent Application Publication No. US 2002/0,039,895 A1 to Ross et al, published Apr. 4, 2002, the disclosure of which is incorporated by reference. A wireless telephone digitizes the voice of a user in response to the depression of a push-to-talk button, either physical or virtual. The digitized voice is sent to a base station, which places the data on a server. Other wireless telephones can recover the data for conversion back to digitized voice. However, users must activate the push-to-talk button to transact a voice communication and session-based voice communications between individual and ad hoc moderatable discussion groups are not contemplated.

A position-linked chat system, method and computer product, is described in U.S. Patent Application Publication No. US 2002/0,007,396 A1 to Takakura et al., published Jan. 17, 2002, the disclosure of which is incorporated by reference. A server device includes a chat room controller, which generates a plurality of chat rooms based on a geographical standard; a chat room selector, which selects a chat room in which a user on a specific terminal can participate based on information relating to the current position of that terminal, and a voice controller, which mixes voices of users transmitted from the terminals of respective users participating in the same chat room. However, session-based forms of voice messaging communication that flexibly allow participation in multiple, simultaneous and moderatable discussion groups are not contemplated.

Wireless chat automatic status tracking is described in U.S. Patent Application Publication No. US 2001/0,031,641 A1 to Ung et al, published Oct. 18, 2001, the disclosure of which is incorporated by reference. A technique and apparatus provide status tracking of a presence or location of a mobile wireless device, even outside of a particular wireless system. In one disclosed embodiment, a wireless chat tracking system utilizes a change in mobile registration status to automatically notify a chat group system outside the wireless network of current status information activity. However, session-based forms of voice messaging communication that flexibly allow participation in multiple, simultaneous and moderatable discussion groups are not contemplated.

Chat server and wireless chat devices are described in U.S. Patent Application Publications Nos. US 2002/0,016,163 A1 and US 2002/0,094,803 A1, both to Burgan et al., respectively published on Feb. 7, 2002, and Jul. 18, 2002, the disclosures of which are incorporated by reference. A wireless communication system includes a system controller, radio frequency (RF) transmitter, RF receiver, transmit antenna, receive antenna, chat server, and a plurality of wireless communication devices. The chat server manages the communication of a plurality of chat discussions, facilitating substantially real-time communication among the wireless communication devices within the wireless communication system. However, users must activate the push-to-talk button to transact a voice communication and session-based voice communications between individual and ad hoc moderatable discussion groups are not contemplated.

Accordingly, there is a need for an approach to providing for a system and method that provides flexible voice communications between a plurality of individuals and discussion groups, preferably through a centralized voice message server and personal communication device clients, which automatically detect voice communications responsive to a user activated "attention."

SUMMARY OF THE INVENTION

One embodiment of the present invention provides a system and method for providing flexible message-based communications between two or more individuals logically interconnected over a centralized messaging infrastructure. A voice message server interfaces to a plurality of personal communication devices (PCDs) over a wireless data network. Each PCD includes an "Attention" button that alerts the PCD to begin processing voice messages. Voice messages are forwarded to the voice message server and are queued, stored and played to the user of the receiving PCD. Each user must be signed on in a voice messaging session and can participate in one or more moderatable and simultaneous discussion groups.

An embodiment provides a system and method for providing flexible message-based communications over a centralized messaging infrastructure. A plurality of symmetric digital voice messages are processed. One or more voice message sessions are centrally transacted over a digital data network. Each such digital voice message is transiently stored. A plurality of devices is logically interconnected by routing each transiently stored digital voice message between the interconnected devices.

A further embodiment provides a system and method for providing flexible message-based communications with personal communication devices over a centralized messaging infrastructure. Digital voice messages including digitized voice originate through a plurality of personal communication devices. The one or more personal communication devices are communicatively interfaced over a digital data network. The digital voice messages are processed. Each digital voice message is received from at least one such personal communication device. The digital voice message is transiently stored. The digital voice message is sent to at least one such personal communication device identified in the digital voice message.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 1 is a block diagram showing a system for providing multi-party message-based voice communications, in accordance with the present invention.

FIG. 2 is a block diagram showing the logical structure of a PCD for use in the system of FIG. 1.

FIG. 3 is a process flow diagram showing the processing of a voice message by the system of FIG. 1.

DETAILED DESCRIPTION

Multi-Party Message-Based Voice Communications System

Figure 4:
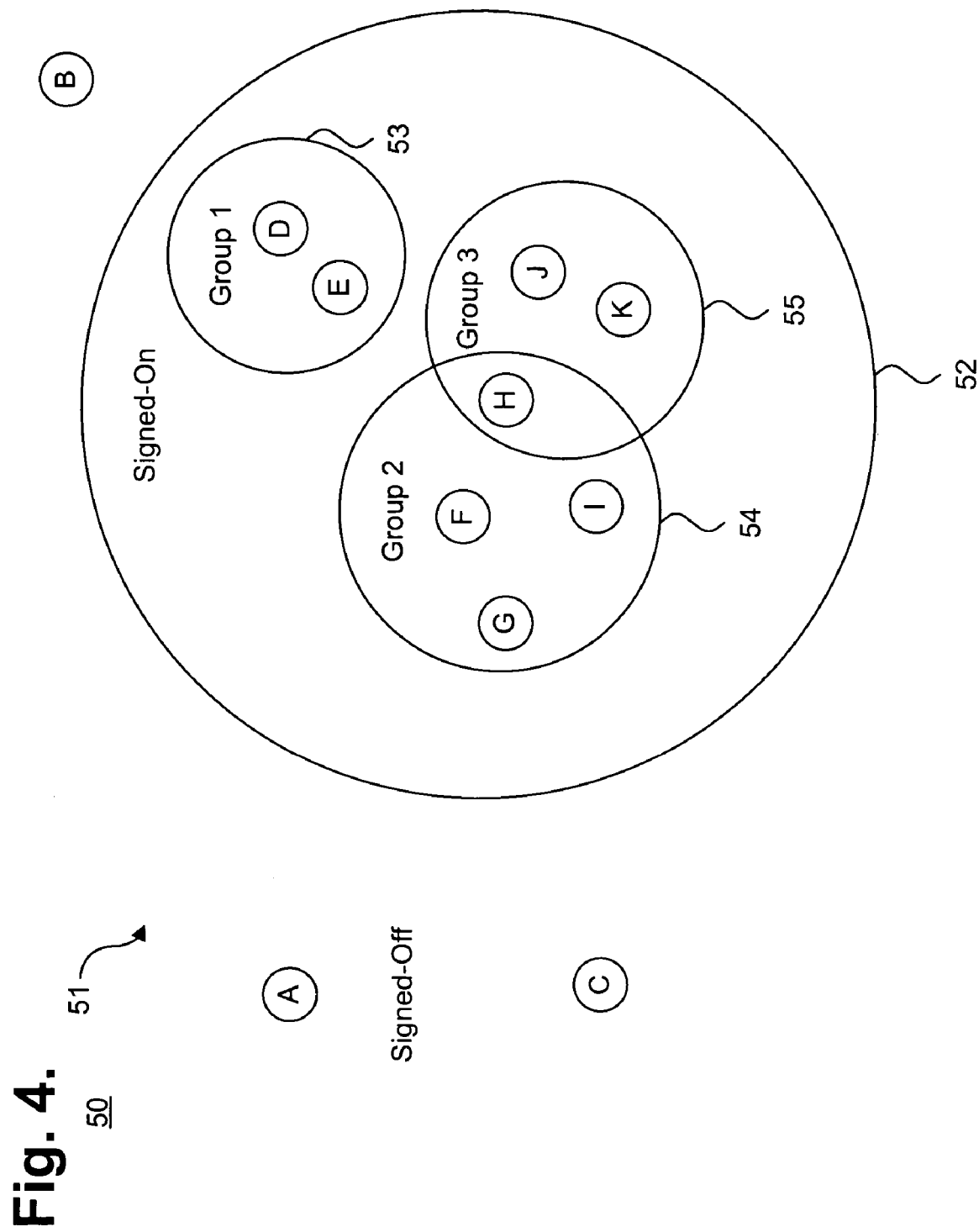
FIG. 4 is a Venn diagram showing individual and group relationships as managed by the system of FIG. 1.

FIG. 1 is a block diagram showing a system 10 for providing multi-party message-based voice communications, in accordance with the present invention. Multiple personal communication devices (PCDs) 11 are communicatively interfaced with a voice message server 12 over a wireless data network 14, such as the General Packet Radio Service (GPRS), to provide voice-messaging services. Other forms and configurations of wireless data networks are feasible, as would be recognized by one skilled in the art. Each PCD 11 provides voice communications through voice messaging by converting analog voice signals into digital voice messages 13 exchanged via a digital data stream transmitted over the wireless data network 14. PCDs 11 are further described below with reference to FIG. 2. The voice message server 12 provides message routing, security and session management, as further described below with reference to FIG. 6.

In an alternate embodiment, the functionality of a PCD is provided through a PCD proxy 16 located in a proxy message server 15. The proxy message server 15 operates in place of an actual PCD 11 and individual PCD proxies 16 are assigned to conventional cellular telephones 17 operating over a conventional cellular wireless network 18, as is known in the art. The PCD proxy 16 accepts incoming voice messages 21 received via the voice message server 12 to the cellular telephone 17 and forwards outgoing voice messages 22 received via the cellular telephone 17.

In a further alternate embodiment, PCD logic 20 is integrated directly into cellular telephones 19 operating over the conventional cellular wireless network 18 with the PCD logic 20 being communicatively interfaced with the voice message server 12 over the wireless data network 14. The PCD-enabled cellular telephone 19 provides conventional real-time cellular telephone service while the PCD logic 20 offers time-shiftable voice communications through voice messaging. Other configurations, topologies, and arrangements of PCDs 11, PCD proxies 16, PCD logic 20, cellular telephones 17 and 19, voice message servers 11, proxy message servers 15, and related system components and interconnections are feasible, as would be recognized by one skilled in the art.

Personal Communication Device

FIG. 2 is a block diagram showing the logical structure 30 of a PCD 11 for use in the system 10 of FIG. 1. The PCD is functionally divided into a voice message processing and control module 31 and message storage module 32. The voice message processing and control module 31 includes logic for converting analog voice signals into digitized form, managing message queuing and storage, and controlling voice processing functions, including standby and active modes activated via an "Attention" button, as further described below with reference to FIG. 7. The message storage module 32 includes a message buffer 33 for assembling outgoing voice messages, a message queue 34 for transitorily storing voice messages, and a message store 35 for persistently storing saved voice messages.

Voice Message Processing

FIG. 3 is a process flow diagram showing the processing 40 of a voice message 13 by the system 10 of FIG. 1. A user begins by signing into the voice message server 12 to initiate a voice messaging session (Step ①). The user then sends one or more voice messages 13 by speaking through the PCD 11 (Step ②). Typically, a copy of the sent voice message 13 will also be stored in the message store 35 of the PCD 11. Note that for purposes of discussion, a PCD 11 is referenced with respect to the processing 40 of a voice message 13, although the processing 40 could equally be performed by a PCD proxy 16 or PCD logic 20, as would be recognized by one skilled in the art. Accordingly, unless otherwise explicitly stated, references to PCD 11 will apply equally and interchangeably to the PCD proxy 16 and PCD logic 20.

The voice message server 12 then forwards the voice message 13 to the PCD 11 of the intended recipient or recipients (Step ③). Upon receipt, the receiving PCD 11 stores, queues and plays the received voice message to the user (Step ④). Likewise, the recipient user can send back a voice message 13 in reply and a voice message exchange will continue until the user terminates by signing out of the voice message server 12 to end the voice messaging session (Step ⑤).

The system 10 is fully symmetric in the sense that any user can send or receive messages at any time. A user can manipulate a PCD 11 to listen to previous voice messages 13 that have been sent or received and can also forward. edit and resend voice messages 13. In addition, a voice message 13 can be sent from one user to many users or from many users to many users, such as in a voice conference scenario. Importantly, the user interface of each PCD 11 enables time-shiftable voice communications through user controllable store and forward messaging functionality inherent to the PCDs 11, as well as in the voice message server 12, described below with reference to FIG. 6.

Individual and Group Session Management

FIG. 4 is a Venn diagram showing individual and group relationships 50 as managed by the system 10 of FIG. 1. Voice messaging is provided through user sessions during which a user of a PCD 11 is either signed on or signed off of a voice message server 12. The concept of a signed-on user functions independently from physical PCDs 11. The system 10 tracks sign-on users, which are each assigned to a voice messaging session. A signed-on user can be associated with one or more PCDs 11, and only signed-on users can receive or send voice messages 13.

A user is either signed-off 51 or signed-on 52. Here, Users A, B, and C are signed off while Users D though K are signed on. In addition, two or more users can participate in a discussion group 53, 54, 55. A discussion group 53, 54, 55 is a set of signed-on users who communicate between each other in a separate user session. When a member of a discussion group sends a voice message 13, all other members receive the same voice message 13. One-to-one communications are achieved by establishing a discussion group 53 that has exactly two users.

Users can join different discussion groups 53, 54, 55. More users can also join multiple discussion groups. Here, Users D and E participate in their own discussion group 53, Users F through I participate in another discussion group 54, and Users H, J, and K participate in yet another discussion group 55. Note User H is participating in two separate discussion groups, 54, 55. A user participating in multiple discussion groups 53, 54, 55 receives voice messages 13 from all of the groups. If a user specifies an active discussion group 53, 54, 55, a voice message 13 is sent only to the members of that group.

Voice Message Format

Figure 5:
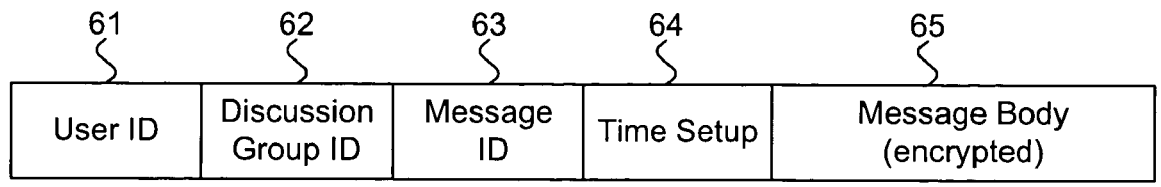
FIG. 5 is a data structure diagram showing a schema for organizing a voice message exchanged through the system of FIG. 1.

FIG. 5 is a data structure diagram showing a schema 60 for organizing a voice message 13 exchanged through the system 10 of FIG. 1. A voice message 13 is identified by at least a user ID 61 and a discussion group ID 62. Other types of identifiers are possible in addition to the user ID 61 and discussion group ID 62, as would be recognized by one skilled in the art. The voice message server 12 uses the user ID 61 and discussion group ID 62 in determining appropriate message processing.

In addition, in the described embodiment, each voice message 13 further includes a message ID 63 and time-stamp 64, preferably consisting of a standardized date and time marker, such as GMT. The actual digitized voice message is stored in the message body 65, preferably compressed in an encrypted form.

Voice Message Server

Figure 6:
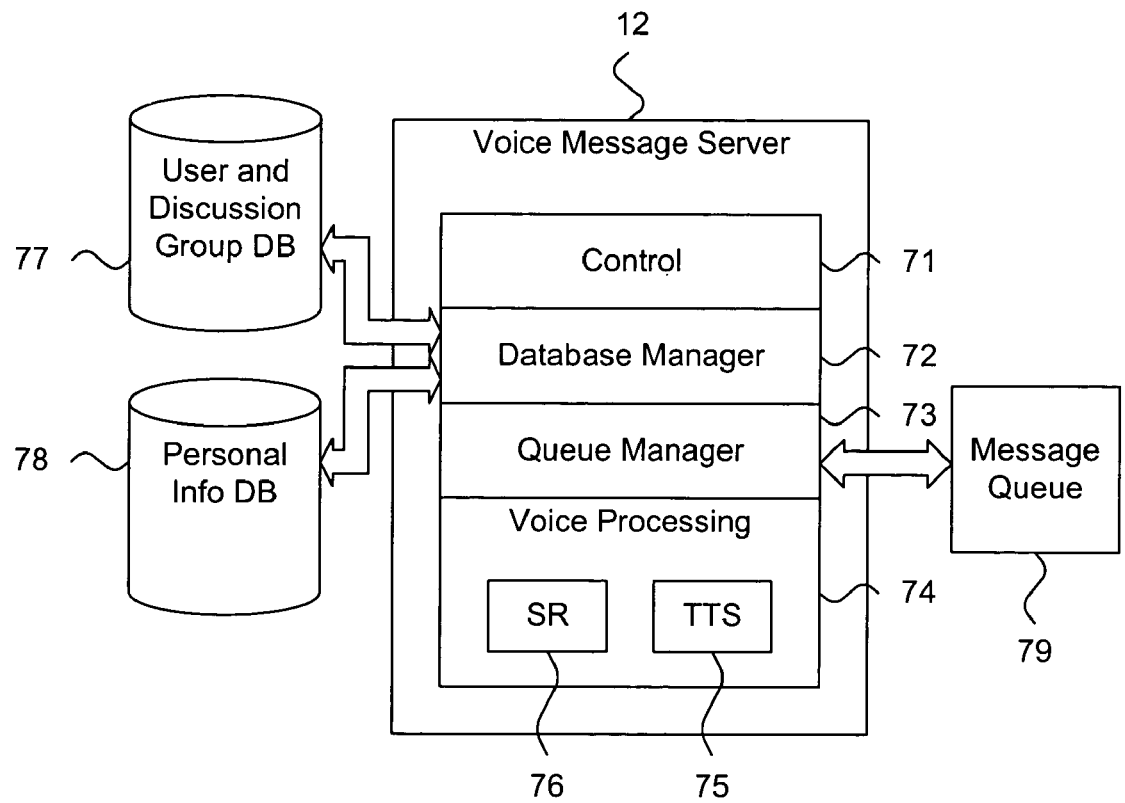
FIG. 6 is a block diagram showing the logical structure of a voice message server for use in the system of FIG. 1.

FIG. 6 is a block diagram showing the logical structure 70 of a voice message server 12 for use in the system 10 of FIG. 1. The voice message server 12 is logically structured into four modules. A control module 71 handles control messages received from PCDs 11 to handle sign-on, sign-off, and group discussion requests and other voice messaging commands.

A database manager module 72 interfaces with a voice message server 12 to two databases, a user and discussion group database 77 and a personal information database 78. The user and discussion group database 77 maintains a list of signed-on users and discussion groups. The personal information database 78 maintains personal information about system users that is used during sign-on.

A queue manager 73 performs the store-and-forward processing of transient voice messages 13, which are staged in a message queue 79 pending dispatch. Finally, a voice processing module 74 includes speech recognition 76 and text-to-speech 75 logic, as is known in the art. Note that the voice message server 12, in conjunction with the user interface of each PCD 11, enables time-shiftable voice communications through user controllable store and forward messaging functionality.

PCD Physical Component Structure

Figure 7:
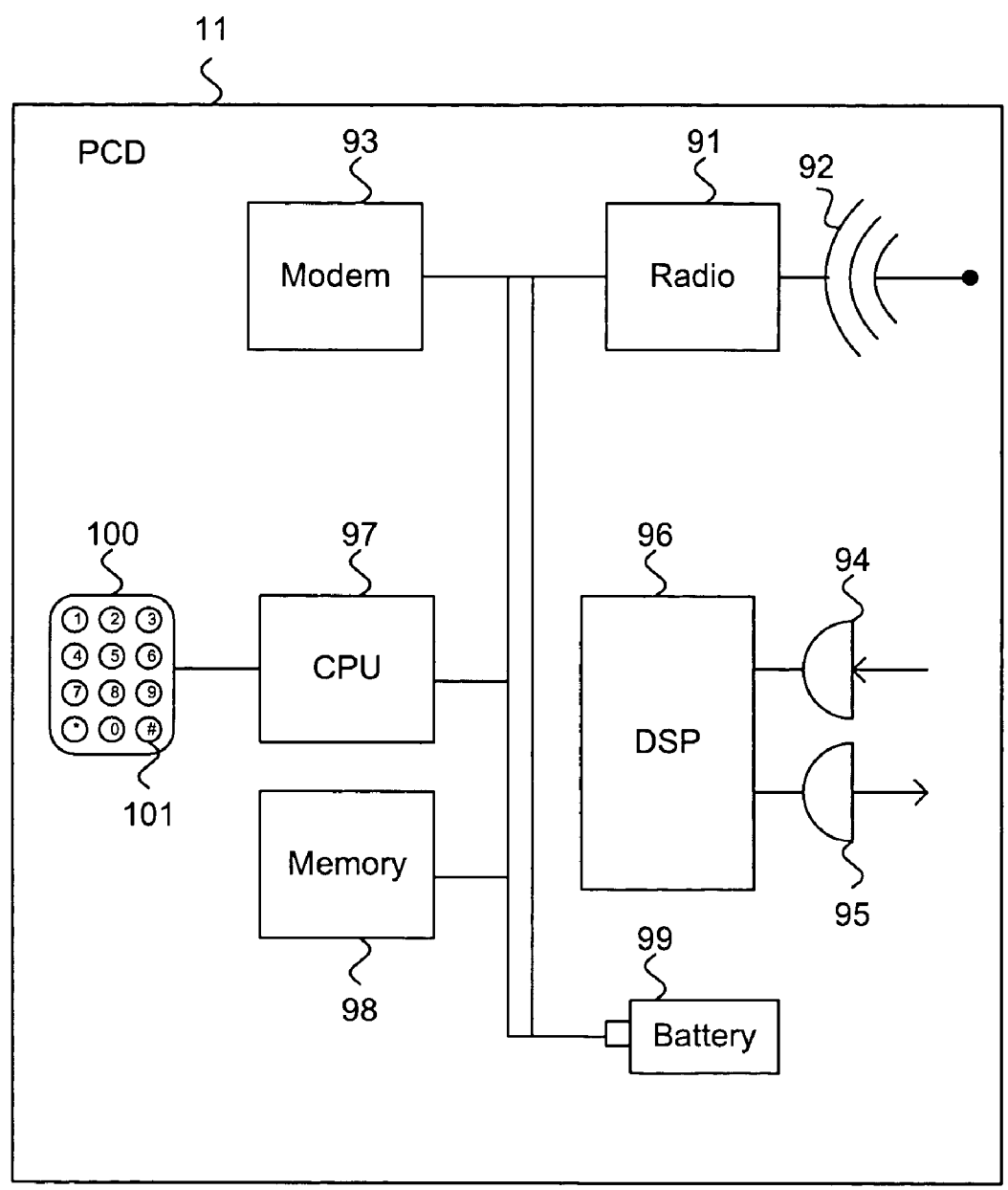
FIG. 7 is a block diagram showing the physical components of a PCD used by the system of FIG. 1.

FIG. 7 is a block diagram showing the physical components 90 of a PCD 11 used by the system 10 of FIG. 1. In the described embodiment, each PCD 11 comprises a wide area data network radio 91, antenna 92 and modem 93, a microphone 94 and an earphone or speaker 95, a digital signal processor (DSP) 96, a man-machine interface 100, such as buttons or a keypad, a central processor unit (CPU) 97, memory 98, and a battery or power source 99.

The man-machine interface 100 includes an "Attention" button 101, which is activated by a user to notify the PCD 11 to commence voice message processing. Unlike a push-to-talk button, the "Attention" button 101 transitions the PCD 11 from a standby mode into an active mode, whereby voice inputs are monitored and processed. The DSP 96 processes the voice signals to distinguish between speech and ambient noise and third-party conversations. The "Attention" button 101 can be used to temporarily deactivate the PCD 11 during a session when a continuous communication stream is not desired.

Sound is captured by the microphone 95 and transformed to an electrical signal. The digital signal processor 96 digitizes and processes the sound to remove noise and echo and to identify the beginning and ending points of speech. Each identified digitized sound segment is further encoded into one or more voice messages 13 that are sent over the wireless data network 14 to the message server 12.

In the described embodiment, each voice message 13 is numbered, time-stamped and identified by a user ID 61. Further, the voice messages 13 are preferably encrypted using secret keys known only to the PCD 11 and the voice message server 12 and compressed in an encrypted form. Similarly, voice messages 13 received by the PCD 11 from the voice message server 12 are decompressed, decrypted, concatenated if required, and converted into an electrical signal and played to the user via the earphone 95.

The PCD physical form factor can be in the form of self-contained headphones packaged as a small device clipped to clothing and connected via an electrical wire to a combination earphone and microphone ensemble.

In an alternate embodiment, the user uses a conventional landline or wireless cellular telephone that is in communication with a PCD proxy 16 over a telephone network. Typically, the PCD proxy 16 resides at a stationary location similar to that of the voice message server 12 and functions similarly to a PCD 11.

PCD proxies 16 lack the earphones and microphones and instead connect to the telephone network. Each PCD proxy 16 can receive sound from the telephone instrument and process the sound in the same manner as a PCD 11 by sending voice messages 13 to the voice message server 12. Each PCD proxy 16 also receives voice messages 13 from the voice message server 12 and processes the messages in the same manner as a PCD 11 by sending the resulting sound to the telephone instrument.

In a further alternate embodiment, PCD functionality can be embedded directly into a wireless cellular telephone. Speech first is recorded by the PCD logic 20 for transmission later and received speech is first stored by the PCD logic 20 and later played to the user.

Multi-Party Message-Based Voice Communications Method

In the described embodiment, each PCD 11 is operated and controlled by the user using voice commands. A user can instruct the PCD 11 to record, review, and send a voice message 13. The user can also instruct the PCD 11 to replay older voice messages 13, skip through messages, and provide various message playback and storage management features.

During operation, a PCD 11 continuously listens for a voice input. Each PCD 11 is equipped with an "Attention" button to assist a PCD 11 in determining when a voice input is actually intended, since ambient sound and third-party voice conversations could inadvertently trigger an unintentional transmission of a voice message 13. To use the "Attention" button, a user momentarily presses and releases the button to indicate to the PCD 11 that a voice input requires parsing as operational commands. Additional buttons can also be added to duplicate the function of some or all PCD voice commands.

Although similar to two-way radio communication, PCD-to-PCD communication is transacted exclusively through the voice message server 12 and no direct peer-to-peer communications occur.

User Sign-On

To sign-on, a user operates a PCD 11 to provide authentication information that is checked against the personal information database 78 to verify the identity of the user. Once verified, a user ID 61 is added to the user and discussion group database 77 and a PCD ID is associated with the user ID 61. The user is now signed-on.

To sign-off, the user operates the PCD 11 to instruct the voice message server 12 to perform sign-off. The PCD 11 can automatically sign-off a user when the same PCD 11 is used to sign-on another user, or the PCD 11 can allow multiple users to be signed-on at the same time, such as by supporting several different system identities.

In the described embodiment, a user-name is associated with each user ID. A user can query the system to find out whether another user is signed-on by specifying a user name.

Discussion Groups

A discussion group is a list of user IDs 61. Each discussion group has a discussion group ID and an associated discussion-group-name. To join a discussion group, a user must be signed-on. The user then instructs the PCD 11 to send a control message to the voice message server 12 requesting to join a discussion group. The voice message server 12 adds an entry to the discussion group list in the user and discussion group database with the requesting user ID 61. Similarly, the user can ask to be removed from a discussion list.

When a user signs on, the message server automatically creates a discussion group whose only member is that user. The name of that discussion group is identical to the user-name of the signing on user. A user also can create and name a discussion group.

A user can query the voice message server 11 to check whether another user is a member of a discussion group that the first user has created, or to check for a list of all participating users of a discussion group.

Message Server

The voice message server 13 manages message queues for discussion groups. Upon the receipt of a voice message 13 from a PCD 11, the voice message server 12 obtains the discussion group ID 62 and adds the voice message 13 to the appropriate queue.

The voice message server 13 also scans all queues in a timely manner. For each queue, the voice message server 13 obtains a list of users that are members of that discussion list. The voice message server 13 then builds a sub-list of the signed-on users and generates a list of the PCDs 11 that are associated with the sign-on users that are members of the discussion group. The voice message server 12 takes the voice message 13 at the head of the queue and sends the message to all PCDs 11 that belong to that list. The voice message server 12 then removes the message 13 from the queue and moves to the next queue. In an alternate embodiment, the voice message server 12 keeps old voice messages, and the PCD 11 enables a user to fetch queued messages that had been delivered before the user signed on.

Discussion Group Moderator

A signed-on user who is a member of a discussion group can be the moderator of a discussion group. During a moderated discussion, the voice message server 12 first sends each voice message 13 for the discussion group to the moderator. The moderator reviews the voice message 13 and can accept or reject the message. An accepted voice message 13 is sent to the remainder of the group. The moderator also can annotate the voice message 13.

While the invention has been particularly shown and described as referenced to the embodiments thereof, those skilled in the art will understand that the foregoing and other changes in form and detail may be made therein without departing from the spirit and scope of the invention.

What is claimed is:

1. A system for providing flexible message-based communications over a centralized messaging infrastructure, comprising:
    a controller, comprising:
        an interface to a plurality of devices interconnected over a digital data network, each device being physically located at a location distinctly removed from each other device;
        a security module configured to provide security to digital voice messages exchanged with each device by applying encryption using a key unique to each of the devices;
        an access module configured to process a sign-in requested by a user via at least one of the devices; and
        a session module configured to form a plurality of voice message sessions for the user associated with the at least one device and, for each of the voice message sessions, to add the user associated with the at least one device to a discussion group; and
    a voice message server configured to centrally transact the voice message sessions, comprising:
        a message queue configured to receive the digital voice messages for the at least one device, to associate a user identifier and a discussion group identifier with each of the digital voice messages, and to transiently store the digital voice messages; and
        a queue manager configured to route the transiently stored digital voice messages to another of the devices,
    wherein logical participation in a plurality of the discussion groups is provided through exchange of the digital voice messages between the at least one device and each other of the devices in the discussion groups.

2. A system according to claim 1, further comprising:
a message router to perform store-and-forward processing of the transiently stored digital voice messages.

3. A system according to claim 1, wherein the devices are grouped in a relationship selected from the group comprising one of a one-to-one, one-to-many and many-to-many.

4. A system according to claim 1, further comprising:
a storage device configured to persistently store each such digital voice message.

5. A system according to claim 1, further comprising:
a voice processing component configured to process analog voice into the digital voice messages.

6. A system according to claim 5, further comprising:
a speech recognition component configured to transcribe the digital voice messages using the device.

7. A system according to claim 5, further comprising:
a speech recognition component configured to transcribe the digital voice messages using a proxy voice server interfaced to the device over a voice network.

8. A system according to claim 5, further comprising:
a speech recognition component configured to transcribe the digital voice messages using translation logic integrated into the device.

9. A system according to claim 5, further comprising:
a voice communications interface configured to concurrently transact voice communications over a voice network relative to the voice message session.

10. A method for providing flexible message-based communications over a centralized messaging infrastructure, comprising:
    interfacing a plurality of devices over a digital data network, each device being physically located at a location distinctly removed from each other device;
    providing security to digital voice messages exchanged with each device by applying encryption using a key unique to each of the devices;
    processing a sign-in requested by a user via at least one of the devices;
    forming a plurality of voice message sessions for the user associated with the at least one device and, for each of the voice message sessions, adding the user associated with the at least one device to a discussion group; and
    centrally transacting the voice message sessions, comprising:
        receiving the digital voice messages for the at least one device;
        associating a user identifier and a discussion group identifier with each of the digital voice messages;
        transiently storing the digital voice messages; and
        routing the transiently stored digital voice messages to another of the devices,
    wherein logical participation in a plurality of the discussion groups is provided through exchange of the digital voice messages between the at least one device and each other of the devices in the discussion groups.

11. A method according to claim 10, further comprising:
performing store-and-forward processing of the transiently stored digital voice messages.

12. A method according to claim 10, further comprising:
grouping the devices in a relationship selected from the group comprising one of a one-to-one, one-to-many and many-to-many.

13. A method according to claim 10, further comprising:
persistently storing each such digital voice message.

14. A method according to claim 10, further comprising:
processing analog voice into the digital voice messages.

15. A method according to claim 14, further comprising:
converting analog voice signals into the digital voice messages using the device.

16. A method according to claim 14, further comprising:
transcribing analog voice signals into the digital voice messages using a proxy voice server interfaced to the device over a voice network.

17. A method according to claim 14, further comprising:
transcribing analog voice signals into the digital voice messages using translation logic integrated into the device.

18. A method according to claim 14, further comprising:
concurrently transacting voice communications over a voice network relative to the voice message session.

19. A computer-readable storage medium holding code for performing the method according to claim 10.

20. An apparatus for providing flexible message-based communications over a centralized messaging infrastructure, comprising:
   means for interfacing a plurality of devices over a digital data network, each device being physically located at a location distinctly removed from each other device;
   means for providing security to digital voice messages exchanged with each device by means for applying encryption using a key unique to each of the devices;
   means for processing a sign-in requested by a user via at least one of the devices;
   means for forming a plurality of voice message sessions for the user associated with the at least one device and, for each of the voice message sessions, means for adding the user associated with the at least one device to a discussion group; and
   means for centrally transacting the voice message sessions, comprising:
      means for receiving the digital voice messages for the at least one device;
      means for associating a user identifier and a discussion group identifier with each of the digital voice messages;
      means for transiently storing the digital voice messages; and
      means for routing the transiently stored digital voice messages to another of the devices,
   wherein logical participation in a plurality of the discussion groups is provided through exchange of the digital voice messages between the at least one device and each other of the devices in the discussion groups.

21. A system for providing flexible message-based communications with personal communication devices over a centralized messaging infrastructure, comprising:
   a plurality of personal communication devices configured to originate digital voice messages comprising digitized voice, each personal communication device being physically located at a location distinctly removed from each other personal communication device;
   a voice message server configured to communicatively interface to the one or more personal communication devices over a digital data network, comprising:
      a security module configured to provide security to the digital voice messages exchanged with each personal communication device by applying encryption using a key unique to each of the personal communication devices;
      an access module configured to process a sign-in requested by a user via at least one of the personal communication devices;
      a session module configured to form a plurality of voice message sessions for the user associated with the at least one personal communication device and, for each of the voice message sessions, to add the user associated with the at least one personal communication device to a discussion group; and
   a queue manager to centrally process the digital voice messages, comprising:
      a receiver module configured to receive each digital voice message from at least one such personal communication device;
      an identification module configured to associate a user identifier and a discussion group identifier with each digital voice message;
      a message queue configured to transiently store the digital voice message; and
      a sender module configured to send the digital voice message to at least one such personal communication device identified in the digital voice message,
   wherein logical participation in a plurality of the discussion groups is provided through exchange of the digital voice messages between the at least one personal communication device and each other of the personal communication devices in the discussion groups.

22. A system according to claim 21, further comprising:
   a database manager configured to interface to a plurality of databases, comprising:
      a user and discussion group database configured to store session information;
      a personal information database configured to store personal information;
   a control module configured to provide an interface authenticating at least one personal communication device against the personal information; and
   a queue manager configured to stage each such digital voice message and to forward the digital voice message based on the session information.

23. A system according to claim 21, further comprising:
   a proxy message server configured to communicatively interface a personal communication device with the voice message server.

24. A system according to claim 21, further comprising:
   a cellular telephone configured to integrate with at least one such personal communication device.

25. A system according to claim 21, wherein the one or more personal communication devices further comprise:
   a voice message module configured to digitize spoken voice messages;
   a message storage module configured to store transient spoken voice messages, comprising:
      a buffer configured to assemble outgoing spoken voice messages;
      a message queue configured to transitorily store the outgoing spoken voice messages; and
      a message store configured to persistently store saved spoken voice messages.

26. A method for providing flexible message-based communications with personal communication devices over a centralized messaging infrastructure, comprising:
   originating digital voice messages comprising digitized voice through a plurality of personal communication devices, each personal communication device being physically located at a location distinctly removed from each other personal communication device;
   communicatively interfacing the one or more personal communication devices over a digital data network, comprising:
      providing security to the digital voice messages exchanged with each personal communication device by applying encryption using a key unique to each of the personal communication devices;
      processing a sign-in requested by a user via at least one of the personal communication devices;
      forming a plurality of voice message sessions for the user associated with the at least one personal communication device and, for each of the voice message sessions, adding the user associated with the at least one personal communication device to a discussion group; and
   centrally processing the digital voice messages, comprising:

receiving each digital voice message from at least one personal communication device;

associating a user identifier and a discussion group identifier with each digital voice message;

transiently storing the digital voice message; and sending the digital voice message to at least one personal communication device identified in the digital voice message, wherein logical participation in a plurality of the discussion groups is provided through exchange of the digital voice messages between the at least one personal communication device and each other of the personal communication devices in the discussion groups.

27. A method according to claim 26, further comprising:

interfacing to a plurality of databases, comprising:

maintaining a user and discussion group database to store session information;

maintaining a personal information database to store personal information;

providing an interface authenticating at least one personal communication device against the personal information; and staging each digital voice message and to forward the digital voice message based on the session information.

28. A method according to claim 26, further comprising:

communicatively interfacing a personal communication device with the voice message server through a proxy message server.

29. A method according to claim 26, further comprising:

integrating a cellular telephone with at least one such personal communication device.

30. A method according to claim 26, wherein the one or more personal communication devices further comprise:

digitizing spoken voice messages;

storing transient spoken voice messages, comprising:

assembling outgoing spoken voice messages;

transitorily storing the outgoing spoken voice messages; and persistently storing saved spoken voice messages.

31. A computer-readable storage medium holding code for performing the method according to claim 26.

32. An apparatus for providing flexible message-based communications with personal communication devices over a centralized messaging infrastructure, comprising:

means for originating digital voice messages comprising digitized voice through a plurality of personal communication devices, each personal communication device being physically located at a location distinctly removed from each other personal communication device;

means for communicatively interfacing the one or more personal communication devices over a digital data network, comprising:

means for providing security to the digital voice messages exchanged with each personal communication device means for by applying encryption using a key unique to each of the personal communication devices;

means for processing a sign-in requested by a user via at least one of the personal communication devices;

means for forming a plurality of voice message sessions for the user associated with the at least one personal communication device and, for each of the voice message sessions, means for adding the user associated with the at least one personal communication device to a discussion group; and means for centrally processing the digital voice messages, comprising:

means for receiving each digital voice message from at least one such personal communication device;

means for associating a user identifier and a discussion group identifier with each digital voice message;

means for transiently storing the digital voice message; and means for sending the digital voice message to at least one such personal communication device identified in the digital voice message, wherein logical participation in a plurality of the discussion groups is provided through exchange of the digital voice messages between the at least one personal communication device and each other of the personal communication devices in the discussion groups.

* * * * *